Sept. 16, 1969
A. H. HANSON
3,467,140
HERMETICAL SEALING MECHANISM
Filed July 16, 1965
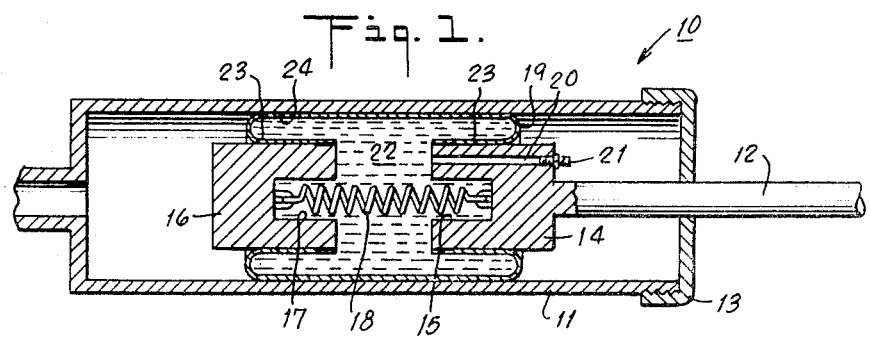
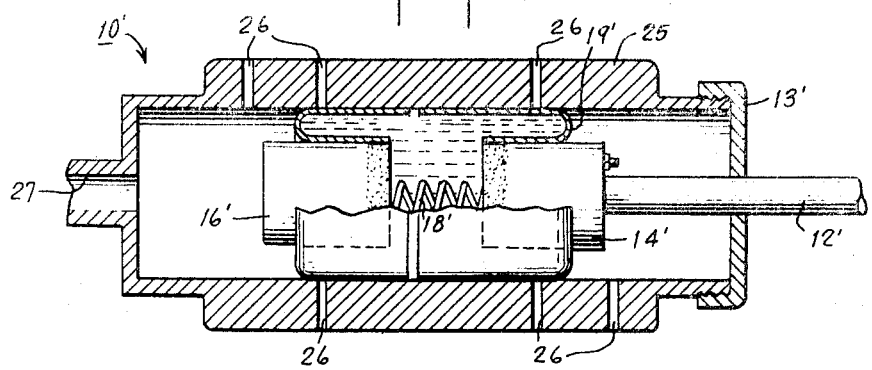
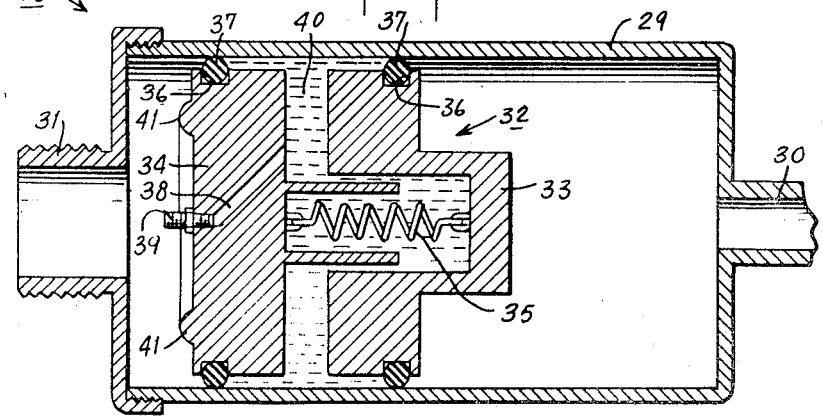
INVENTOR.
ALFRED H. HANSON
BY *Kenyon & Kenyon*
ATTORNEYS United States Patent Office 3,467,140
Patented Sept. 16, 1969

3,467,140
HERMETICAL SEALING MECHANISM
Alfred H. Hanson, Putnam County, N.Y., assignor to Ralph P. Piffath, East Norwich, N.Y.
Filed July 16, 1965, Ser. No. 472,590
Int. Cl. F16l 55/04
U.S. Cl. 138—31     6 Claims

ABSTRACT OF THE DISCLOSURE

The hermetical seal utilizes a resilient spring to urge a pair of reservoir defining members towards each other so as to create a pressure on the fluid contained in the reservoir in excess of the working pressure acting exteriorly on the members. The members cooperate with the components of the device in which they are incorporated to define a closed reservoir.

---

This invention relates to a hermetical sealing mechanism. More particularly, this invention relates to a hermetical sealing mechanism which is interposed between relatively movable members.

It is known that certain type seals can be provided between a pair of relatively slidable members where the fluid medium or pressure within one portion defined by the members is disparate from another portion also defined by the members. One type of such seals utilizes the principle of folding an elastic tube back upon itself. Each end of such a folded tube is then fastened to one of the opposed surfaces of a pair of relatively slidable cylindrical members so as to form a seal barrier between the now separated spaces defined by the members. The fold of such seal is free to move with the relative motion of the slidable members. However, such a rolling seal must rely upon a positive cylinder or working pressure to separate the tube walls during operation. If such pressure drops to zero or becomes negative, the outer tube wall will impinge upon or grip the inner tube wall. The result would be a rapid destruction in spite of any lubricating film existing upon the tube wall surfaces prior to such wall to wall contact. Also, if the device remains static, the constant squeeze of the outer wall would displace such lubricating film from certain areas of contact and render such areas dry. In a like manner, these dry areas will also ultimately occur during actuation.

Since many hydraulic remote control systems of the single tube push-pull type depend on positive and negative pressure actuation, a single folded tube seal is inadequate. Further, the use of a pair of such seals in reversed orientation cannot be utilized except in highly sophisticated modifications of the basic principle. Thus, the folded tube seal is limited to relatively short stroke, low speed, and low pressure applications.

Another type of seal used to create a seal barrier between a pair of relatively slidable cylindrical members is a fully closed toroidally shaped seal envelope. Such a seal envelope is fixed in place to both relatively slidable members and filled with a pressure medium to keep the walls of the envelope separated. However, such an envelope will elongate under the working pressure of the cylindrical members causing unwanted movement between the members, as well as a reduction of pressure on the pressure medium contained therein. Also, since elongation occurs mainly at the fold area, the movement of the cylindrical members causes redistribution of the tensioned area along the straight sided areas of the members thereby preventing the maintaining of a given volume and corresponding pressure.

This invention overcomes the problems of the prior art by providing a hermetical sealing mechanism between a pair of relatively movable members which utilizes a pair of members which cooperate with a fluid between the members to provide a hermetic sealing effect. The hermetic sealing effect is achieved by urging the members towards each other under the influence of a resilient means whereby the pressure on the fluid between the members is maintained at a pressure in excess of the working pressure.

Further, the fluid which is located between the members can be selected to provide an optimum lubricant effect when the hermetical sealing mechanism incorporates a flexible seal or gasket therein such as is the case when the sealing mechanism is movable with respect to one of the relatively movable members. By providing the proper fluid, the life and effectiveness of the sealing mechanism is prolonged. Also the fluid can be selected to be immiscible with the fluids, depending on the environmental use of the sealing mechanism, which are being sealed off by the hermetical sealing mechanism.

Accordingly, it is an object of this invention to provide a seal device for relatively slidable members.

It is another object of this invention to provide a seal device for relatively slidable members wherein a seal barrier is formed between disparate pressure mediums contained between the relatively slidable members.

It is another object of this invention to provide a pressurized seal device for relatively slidable members.

It is another object of this invention to provide a seal device for a piston and cylinder assembly wherein the piston is composed of two separated sections and wherein a pressurized fluid medium is interposed between the separated sections.

It is another object of this invention to provide a seal device for relatively slidable members which can be used for vacuum pressure applications as well as high positive pressure applications.

It is another object of this invention to provide a sealing device for relatively slidable members which utilizes a self-contained fluid.

It is another object of this invention to provide a sealing device for relatively slidable members which utilizes a self-contained fluid under a pressure in excess of the working pressure of the relatively slidable members.

These and other objects and advantages of this invention will become more apparent from the following detailed description and appended claims taken in conjunction with the accompanying drawings in which:

FIG. 1 illustrates a cross-sectional view of a piston and cylinder assembly embodying the invention;

FIG. 2 illustrates a cross-sectional view of a valve assembly embodying the invention;

FIG. 3 illustrates a cross-sectional view of a typical accumulator device embodying the invention; and FIG. 4 illustrates a cross-sectional view of a modification of the invention.

Referring to FIG. 1, a suitable cylindrical piston 10 is mounted for reciprocation in a cylinder body 11. The piston 10 is provided with a rod 12 which is guided by a suitable cap 13 mounted on the cylinder body 11, as by threading, and which is integrally joined to a suitable piston head 14. The piston head 14 is provided with a recess 15 in the end surface thereof and is disposed in concentric spaced alignment with the cylinder body 11. A second piston head 16 is provided with a recess 17 complementary to the recess 15 in the piston rod and is disposed in coaxial alignment with the piston head 14 so that the respective recesses 15, 17 face each other. A tension spring 18 is positioned in axial alignment with and between the piston heads 14, 16 and is secured at each end thereof within the respective recess of each piston head 14, 16 by any suitable means, as for example, an integral hook and eyelet means.

An elastic tube 19 is provided in the space between the piston 10 and cylinder body 11. Each end of the elastic tube 19 is folded over within the tube and secured to a respective piston head 14, 16 by any suitable means, such as by vulcanization, cementing, or other bonding means or mechanical means; whereas, the intermediate surface portion of the elastic tube 19 is likewise secured to the cylinder body 11. Alternatively, the elastic tube 19 may be made of two tubes, each one being bonded to a piston head and the cylinder body 11.

A fluid port 20 and suitable valve means 21 are provided in the piston head 14 for the passage of a suitable fluid into the cavity 22 defined by the piston heads 14, 16 and elastic tube 19. Since the fluid exists as a confined separate entity, it may consist of various liquids, for example, water, alcohol, or lubricant fluids such as petroleum and silicones. However, such fluids must be selected so as to be compatible with the material of the elastic tube 19 and with a view to the pressure, temperature, and thermal expansion conditions to be utilized.

The fluid is pumped into the cavity 22 through the fluid port 20 by any suitable means when the piston heads 14, 16 are in contact with each other, such contact being caused by the spring 18. There are two primary considerations to be made in filling the cavity 22. The first consideration is that the fluid fill the cavity 22 with sufficient fluid to fully separate the opposed walls 23, 24 of the elastic tube 19 a minimum distance and to provide the desired initial internal pressure commensurate with the spring tension employed. In most instances a fluid pressure of approximately 2.5 p.s.i. will be sufficient to properly separate the elastic tube walls 23, 24.

The second consideration in filling the cavity 22 with fluid is the intended use of the piston and cylinder assembly. If the piston rod 10 is to be utilized for drawing a vacuum, it is necessary that the fluid in the cavity 22 be at least equal to atmospheric pressure (about 15 p.s.i.) plus the wall separation pressure (e.g., 2.5 p.s.i.). For example, a fluid pressure of 20 p.s.i. may be used. Once the piston heads 14, 16 begin to separate under the influence of the incoming fluid, the pressure is created entirely by the tension spring 18. Thus, for a particular pressure, the overall length of the piston from the flat face end of piston head 16 to the end of the rod 12 can be easily calculated. Because of the spring 18 and pressurized fluid between the piston heads 14, 16 the piston rod 10 will act as a single unit which includes the second piston head 16.

When the piston rod 10 and cylinder body 11 is so utilized in the vacuum application, the pressure in the cavity 22 will gradually decrease to a value equal to the initial filled pressure less atmospheric pressure. Further, since the seal device can also be used under pressure conditions, when the piston rod 10 and cylinder body 11 are under a working pressure above atmospheric pressure the pressure in the cavity 22 will increase to a value equal to the initial filled pressure plus the working pressure.

Accordingly, no matter what differential pressure conditions are involved, the pressure in the cavity will always be in excess of the working pressure, thereby creating an effective seal barrier against passage of fluid or gas. Further, the piston rod 12 is free to move as a unit relative to the cylinder body 11 as the elastic tube 19 will roll upon itself to the extent of its limits.

The effect of internal fluid pressure on the tube fold is mainly a function of the wall-to-wall spacing and consequent fold radius or impact area. If such space were .010 inch and the working pressure 1,000 p.s.i., the fold would have to contain the thrust of the fluid which would be 10 pounds per lineal inch of fold. The distortion or elongation of the tube fold caused by this force is controlled by the tensile and elastic properties of the tube material employed, as well as the wall thickness. Any slight volume change caused by such tube extension is automatically compensated for by the large fluid reserve held between the piston halves. Therefore, under any working condition, the split piston functions to maintain proper fluid volume and pressure within the internal tube volumes and compensates for all variables such as, work pressure effect, thermal expansion of elastomer, fluid cylinder or piston. Further, the slight change in overall piston length caused by such volume deviation is of no practical consequence and can be disregarded for most applications.

Referring to FIG. 2, a piston rod 10 which is made in the same manner as the piston rod 10 described above and shown in FIG. 1 is mounted concentrically within a suitable valve cylinder 25 and guided by a suitable threaded cap 13'. The valve cylinder 25 has a plurality of ports 26 therein which are adapted to conduct fluid or gas therethrough from an intake means 27. The ports 26 which are shown arbitrarily in FIG. 2 are exposed to the transmitted fluid or gas by the rolling action of the elastic tube 19' on the inner surface of the valve cylinder 25. Such an arrangement can be utilized to provide motor action.

Referring to FIG. 3, an accumulator 28 having a cylindrical body 29, a gas charging valve 30 at one end and an inlet port means 31 at the other end of the body 29 effectively utilizes the above sealing principle in a sliding seal type fashion. A split piston assembly 32 is slidably mounted within the cylindrical body 29 of the accumulator 28 and is adapted to slide from one end of the accumulator 28 to the other upon introduction of a gas under pressure through the gas charging valve. The split piston assembly 32 comprises a pair of axially spaced piston heads 33, 34 which are urged together by a tension spring 35 which is suitably attached to each piston head 33, 34. A groove 36 is provided in the exterior cylindrical surface of each piston head 33, 34 and a suitable O-ring 37 is positioned within each groove 36 so as to form a seal between the accumulator body 29 and each respective piston head 33, 34. The forwardmost piston head 34 includes a fluid port 38 and a suitable fluid charge valve 39 therein for the transmission of fluid therethrough to fill the cavity 40 defined by the piston heads 33, 34, O-rings 37 and body 29. As above, the fluid pressure in the cavity 40 is in excess of the pressure of the contained gas. Thus, there can be no leakage of gas through the fluid barrier at zero inlet pressure.

The valve containing piston head 34 is further provided with a series of hemispherical nubs 41 on the exterior surface thereof which serve to space the split piston assembly 32 from the inlet port means 31 when the inlet pressure is zero gauge.

Referring finally to FIG. 4, the sealing principle is utilized in a fluid packing gland embodiment wherein a shaft 42 is slidably or rotatably mounted within a suitable cylinder 43 and a seal assembly 44 is interposed between the shaft 42 and cylinder 43. The seal assembly 44 comprises a pair of washers 45, one of which abuts a shoulder 46 on the cylnder 43, and a pair of seals 47 having U-shaped cross-sections positioned between the washers 45. The edges of the seals 47 are in sliding seal engagement with the surface of the shaft 42 and the interior surface of the cylinder 43. The seal assembly 44 further comprises an externally threaded stop washer 48 which is threaded into the cylinder 43 and a compression spring 49 which abuts the stop washer 48 at one end thereof and a washer 45 at the other end thereof. The compression spring 49 thus urges the seals 47 towards each other.

In order to properly utilize the fluid packing gland, a suitable fluid is introduced in any suitable manner between the seals 47. Such fluid will consequently be under an initial pressure created solely by the compression spring 49 and will form a high pressure barrier against the passage of fluid or gas. Accordingly, any working pressure introduced at the spring end of the gland will react as previously explained to maintain the fluid at a pressure in excess of said work pressure. It is noted that since the fluid between the seals 47 is under pressure greater than the outside pressure, the edges of the seals will be urged against the slidable shaft 42 with a greater force so as to insure continuous contact therebetween. Also, the amount of fluid between the seals 47 will act as a reservoir against the leakage of fluid.

It is noted that the commonly used elastomeric seal materials cannot function under dry conditions and require a lubricating film between the sliding contact areas during actuation. Even in the so-called self-lubricating plastics an oil-like plasticizer is used which allows the so-called dry operation. However, when such seal materials are static for long periods of time, the lubricating fluid or plasticizer can be driven away from seal to metal contact areas and literally bring about partial vulcanization, or cold-bonding with resultant tearing or abrasion. In the case of this invention, the seals contain an independent supply of lubricant therebetween from which lubricant can be absorbed. This is especially advantageous where the seals must wipe the moving surfaces dry since the dry surfaces cannot supply the needed lubricant. Since the lubricant is independently supplied, it can be selectively chosen to suit the desired working conditions so as to provide optimum seal lubrication and life.

While the invention has been thus described, it is not intended that the invention be so limited since certain modifications in carrying out the invention may be made without departing from the scope of the invention. Accordingly, it is intended that all matter contained in the foregoing description or shown in the accompanying drawings shall be interpreted as illustrative and not in a limiting sense.

What is claimed is:

1. In combination a cylindrical housing member; a rod member positioned concentrically within said housing member, said rod member having a first piston head portion at one end thereof concentrically spaced from said housing member and defining a fluid port therethrough; a valve means secured on said first piston head portion for closing said fluid port therein; a second piston head portion adjacent to and coaxial with said first piston head portion; a resilient means connected at each end thereof to one of said first and second piston head portions, said resilient means urging said piston head portions into coaxial contact with each other; and an elastic tube means sealingly secured at each end thereof in folded over fashion to one of said first and second piston head portions and at an intermediate surface portion thereof to said housing member for defining a fluid reservoir cavity therewith.

2. The combination as set forth in claim 1 further comprising a pressurized fluid medium between said first and second piston head portions and said elastic tube means.

3. The combination as set forth in claim 2 wherein said pressurized fluid is charged into the space between said first and second piston head portions to a pressure in excess of atmospheric pressure.

4. The combination a set forth in claim 2 wherein said pressurized fluid is charged into the space between said first and second piston head portions at a pressure of 20 p.s.i.

5. The combination as set forth in claim 2 wherein said resilient means solely creates the pressure on said pressurized fluid.

6. The combination as set forth in claim 2 wherein said housing member has a plurality of ports therethrough.

References Cited
UNITED STATES PATENTS

| 2,307,755 | 1/1943 | Beckwith | 277—59 XR |
| 2,679,863 | 6/1954 | Tucker | 137—625.28 |

FOREIGN PATENTS

| 333,339 | 8/1930 | Great Britain. |
| 1,056,442 | 4/1959 | Germany. |

LAVERNE D. GEIGER, Primary Examiner

I. C. WADDEY, JR., Assistant Examiner